(12) United States Patent
Song et al.

(10) Patent No.: US 9,110,645 B2
(45) Date of Patent: *Aug. 18, 2015

(54) APPARATUS AND METHOD FOR PROVIDING POWER TO MAIN CONTROLLER BASED UPON POWER-ON/OFF STATE SIGNAL AND RESET SIGNAL FOR RESETTING THE MAIN CONTROLLER

(71) Applicant: Samsung Electronics Co., Ltd., Suwon-si, Gyeonggi-do (KR)

(72) Inventors: Seog-ho Song, Yongin-si (KR); Si-hun Yoo, Suwon-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 222 days.

This patent is subject to a terminal disclaimer.

(21) Appl. No.: 13/707,012

(22) Filed: Dec. 6, 2012

(65) Prior Publication Data

US 2013/0097434 A1 Apr. 18, 2013
US 2014/0258737 A9 Sep. 11, 2014

Related U.S. Application Data

(63) Continuation of application No. 12/882,317, filed on Sep. 15, 2010, now Pat. No. 8,346,107.

(30) Foreign Application Priority Data

Sep. 18, 2009 (KR) .................. 10-2009-0088519
Jul. 1, 2010 (KR) .................. 10-2010-0063623

(51) Int. Cl.
*G06F 1/00* (2006.01)
*G06F 1/26* (2006.01)
(Continued)

(52) U.S. Cl.
CPC .. *G06F 1/26* (2013.01); *G06F 1/24* (2013.01); *G06F 1/3203* (2013.01)

(58) Field of Classification Search
CPC .................. G06F 1/26; G06F 1/3203
USPC .......................................... 713/300
See application file for complete search history.

(56) References Cited

U.S. PATENT DOCUMENTS 4,173,408 A * 11/1979 Stewart ........................ 399/79
5,691,874 A * 11/1997 Miyamoto et al. ............. 361/170
(Continued)

FOREIGN PATENT DOCUMENTS

JP 2008-172914 7/2008

OTHER PUBLICATIONS

United States Non-Final Office Action dated Apr. 26, 2013 issued in U.S. Appl. No. 13/193,994.
(Continued)

*Primary Examiner* — Thomas Lee
*Assistant Examiner* — Santosh R Poudel
(74) *Attorney, Agent, or Firm* — Staas & Halsey LLP

(57) ABSTRACT

An image forming apparatus including an image forming unit to form an image, a user switch unit to output a user operation signal to switch between a power-on state and a power-off state of the image forming apparatus, a main controller to control the image forming unit and to output a power control signal based on the user operation signal, a power switching unit to selectively supply operation power to the main controller based on the user operation signal and the power control signal, and an auxiliary controller to control the power switching unit such that the operation power is not supplied to the main controller when the power control signal is changed in a power-off state.

15 Claims, 11 Drawing Sheets

(51) Int. Cl.
*G06F 1/32* (2006.01)
*G06F 1/24* (2006.01)

(56) References Cited

U.S. PATENT DOCUMENTS

| | | | |
|---|---|---|---|
| 7,293,185 B2 * | 11/2007 | Shimosakoda | 713/322 |
| 2004/0221187 A1 * | 11/2004 | Durand et al. | 713/300 |
| 2005/0044449 A1 * | 2/2005 | Dunstan | 714/25 |
| 2005/0110898 A1 * | 5/2005 | Ryu | 348/372 |
| 2005/0250557 A1 * | 11/2005 | Marschalkowski et al. | 455/574 |
| 2006/0125904 A1 | 6/2006 | Shokai | |
| 2006/0168461 A1 * | 7/2006 | Allen | 713/300 |
| 2008/0126774 A1 * | 5/2008 | Kobayashi | 713/1 |
| 2009/0164816 A1 * | 6/2009 | Yasuda | 713/320 |
| 2010/0100754 A1 * | 4/2010 | May et al. | 713/323 |
| 2011/0181106 A1 * | 7/2011 | Kim | 307/9.1 |
| 2012/0044230 A1 | 2/2012 | Lee et al. | |

OTHER PUBLICATIONS

Office Action dated Apr. 25, 2012 issued in U.S. Appl. No. 12/882,317.
Notice of Allowance dated Aug. 30, 2012 issued in U.S. Appl. No. 12/882,317.

* cited by examiner

APPARATUS AND METHOD FOR PROVIDING POWER TO MAIN CONTROLLER BASED UPON POWER-ON/OFF STATE SIGNAL AND RESET SIGNAL FOR RESETTING THE MAIN CONTROLLER

CROSS-REFERENCE TO RELATED APPLICATIONS

This application is a Continuation Application of prior application Ser. No. 12/882,317, filed on Sep. 15, 2010 in the United States Patent and Trademark Office, which claims priority under 35 U.S.C. 119 (a) from This application claims priority under Korean Patent Application No. 10-2010-0063623, filed on Jul. 1, 2010, in the Korean Intellectual Property Office, the disclosure of which are incorporated herein by reference in their entirety.

BACKGROUND

1. Field of the Invention

Methods and apparatus of the present general inventive concept relate to an image forming apparatus and a control method thereof, and more particularly, to an image forming apparatus to turn on/off a power source based on a user's operation, and a control method thereof.

2. Description of the Related Art

In the related art, image forming apparatuses such as printers, multifunction copiers, facsimiles and the like turn a power source on or off based on a user's operation using a mechanical power switch in order to minimize power consumption when the power source is turned off. Such conventional image forming apparatuses also have a soft-type power switch substituted for a mechanical power switch for the purpose of improving the user's convenience and usability.

Such conventional image forming apparatuses employ a control circuit provided with a microcomputer, discrete circuits, or other circuits to minimize power consumption when the power source is turned off. However, the control circuit provided with the microcomputer is expensive, which results in an increase in the unit cost of the products. On the other hand, when a discrete circuit is used, although the discrete circuits are inexpensive, it is possible for the power source to be turned-on again due to a drop delay of operation power when the power is turned off.

In addition, the conventional image forming apparatuses having a facsimile function do not have an automatic power recovery function after power is interrupted, for example during a power failure, and thus may not escape from a state of being turned-off even if the power source is recovered after the power failure, which may result in impossible facsimile receipt.

SUMMARY

Example embodiments of the present general inventive concept provide an image forming apparatus to turn on/off a power source with less costs and higher reliability based on a user's operation, and a control method thereof.

Example embodiments of the present general inventive concept also provide an image forming apparatus which is capable of performing image forming operations, such as facsimile receipt, when a power source returns to normal after power failure.

Additional embodiments of the present general inventive concept will be set forth in part in the description which follows and, in part, will be obvious from the description, or may be learned by practice of the general inventive concept.

Example embodiments of the present general inventive concept can be achieved by providing an image forming apparatus including an image forming unit to form an image, a user switch unit to output a user operation signal to switch between a power-on state and a power-off state of the image forming apparatus, a main controller to control the image forming unit and to output a power control signal based on the user operation signal, a power switching unit to selectively supply operation power to the main controller based on the user operation signal and the power control signal, and an auxiliary controller to control the power switching unit such that the operation power is not supplied to the main controller when the power control signal is changed in the power-off state.

The image forming apparatus may further include a reset unit to reset the main controller depending on a level of the operation power, and the power control signal is changed if the main controller is reset in the power-off state.

The auxiliary controller may control the power switching unit such that the operation power is supplied to the main controller if the main controller is reset when the image forming apparatus is in a power-on state.

The auxiliary controller may include a logic gate unit to perform a logical operation between the power control signal and the reset signal.

The image forming apparatus may further include an operation trigger to control the power switching unit such that the operation power can be supplied to the main controller if external power is applied in the power-off state.

The image forming apparatus may further include a second power switching unit to perform a switching operation such that a second operation power can be selectively supplied to the image forming unit based on the power control signal.

The main controller may further output a second power control signal to turn the image forming unit on or off, and the image forming apparatus may further include a second power switching unit to perform a switching operation such that a second operation power is selectively supplied to the image forming unit based on the second power control signal.

The auxiliary controller may control the power switching unit to supply the operation power to the main controller if the reset signal is changed when powered on.

Example embodiments of the present general inventive concept can also be achieved by providing a method of controlling an image forming apparatus including an image forming unit to form an image and a controller to control the image forming unit, the method including outputting a user operation signal to switch between a power-on state and a power-off state of the image forming apparatus, supplying operation power to the controller based on the user operation signal, outputting a power control signal based on the user operation signal, controlling the operation power based on the user operation signal and the power control signal such that the operation power is not supplied to the controller when the power control signal is changed in the power-off state.

The method may further include resetting the controller depending on a level of the operation power, and the power control signal may be changed if the controller is reset in the power-off state.

The method may further include supplying the operation power to the controller when the controller is reset in a power-on state.

The method may further include supplying the operation power to the controller if external power is applied in the power-off state.

The method may further include selectively supplying second operation power to the image forming unit based on the power control signal.

The method may further include outputting a second power control signal to turn the image forming unit on or off, and selectively supplying a second operation power to the image forming unit based on the second power control signal.

The method may further include supplying the operation power to the main controller if the reset signal is changed when powered on.

Example embodiments of the present general inventive concept can also be achieved by providing a power control circuit to control a power supply of an image forming apparatus, including a user switching unit to output a user signal to switch between a power-on state and a power-off state of the image forming apparatus, a reset unit to output a reset signal based on a level of operation power supplied to the image forming apparatus, and a power switching unit to generate a power control signal based on the reset signal and the user signal, and to selectively supply the operation power to the image forming apparatus such that the operation power is not supplied to the image forming apparatus when the power control signal is changed in the power-off state.

The user switching unit can receive external power from an external power source, and the power switching unit can supply the operation power to the image forming apparatus after the external power has been interrupted and restored to the user switching unit.

The power switching unit can include a first switch to output a first signal based on a state of the power control signal, and a second switch to output the operation power based on a state of the first signal and the user signal.

Example embodiments of the present general inventive concept can also be achieved by providing an image forming apparatus, including a user switching unit to output a user signal to switch between a power-on state and a power-off state of the image forming apparatus, a controller to output a power control signal based on the user signal, and a power switching unit to receive the power control signal, and to selectively supply the operation power to the image forming apparatus such that the operation power is not supplied to the image forming apparatus when the power control signal is changed in the power-off state.

The image forming apparatus can also include a reset unit to output a reset signal to the controller based on a level of operation power supplied to the image forming apparatus such that the power control signal is changed when the level of operation power decreases below a predetermined threshold level.

The image forming apparatus can include a facsimile machine connected to an external power source, and the power switching unit can supply the operation power to the image forming apparatus after the external power source has been interrupted and restored to enable the facsimile machine to receive or send a facsimile transmission.

The power switching unit can include a first switch to output a first signal based on a state of the power control signal, and a second switch to output the operation power based on a state of the first signal and the user signal.

Example embodiments of the present general inventive concept can also be achieved by providing a method of controlling a power supply of an image forming apparatus, including switching between a power-on state and a power-off state of the image forming apparatus based on a user operation signal, outputting a power control signal based on the user operation signal, and selectively supplying the operation power to the image forming apparatus based on the power control signal such that the operation power is not supplied to the image forming apparatus when the power control signal is changed in the power-off state.

The method can further include changing the power control signal when the level of operation power decreases below a predetermined threshold level.

The method can further include supplying the operation power to the image forming apparatus after an external power supplied to the user switching unit has been interrupted and restored.

The selectively supplying the operation power can include outputting a first signal based on a state of the power control signal, and supplying the operation power based on a state of the first signal and the user operation signal.

Example embodiments of the present general inventive concept can also be achieved by providing a computer-readable medium having embodied thereon computer-readable codes to execute a method of controlling a power supply of an image forming apparatus, the method including switching between a power-on state and a power-off state of the image forming apparatus based on a user operation signal, outputting a power control signal based on the user operation signal, and selectively supplying the operation power to the image forming apparatus based on the power control signal such that the operation power is not supplied to the image forming apparatus when the power control signal is changed in the power-off state.

Accordingly, it is possible to turn on/off a power source of an image forming apparatus with less costs and higher reliability based on a user's operation, and it is possible to perform image forming operations, such as receiving a facsimile, when a power source returns to normal after a power failure.

Exemplary embodiments of the present general inventive concept may also provide a power control circuit to control a power supply of an image forming apparatus, including a user switching unit to output a user signal to switch between a power-on state and a power-off state of the image forming apparatus, a reset unit to output a reset signal based on a level of operation power supplied to the image forming apparatus, and a power switching unit to generate a power control signal based on the reset signal and the user signal, and to selectively supply the operation power to the image forming apparatus when the reset signal is changed when the switch is in the power-on state.

Exemplary embodiments of the present general inventive concept may also provide a method of controlling a power supply of an image forming apparatus, including switching between a power-on state and a power-off state of the image forming apparatus based on a user operation signal, outputting a power control signal based on the user operation signal, and selectively supplying the operation power to the image forming apparatus when the reset signal is changed when the switch is in the power-on state.

BRIEF DESCRIPTION OF THE DRAWINGS

The above and/or other embodiments of the present general inventive concept will become apparent and more readily appreciated from the following description of the exemplary embodiments, taken in conjunction with the accompanying drawings, in which.

DETAILED DESCRIPTION OF THE EMBODIMENTS

Figure 1:
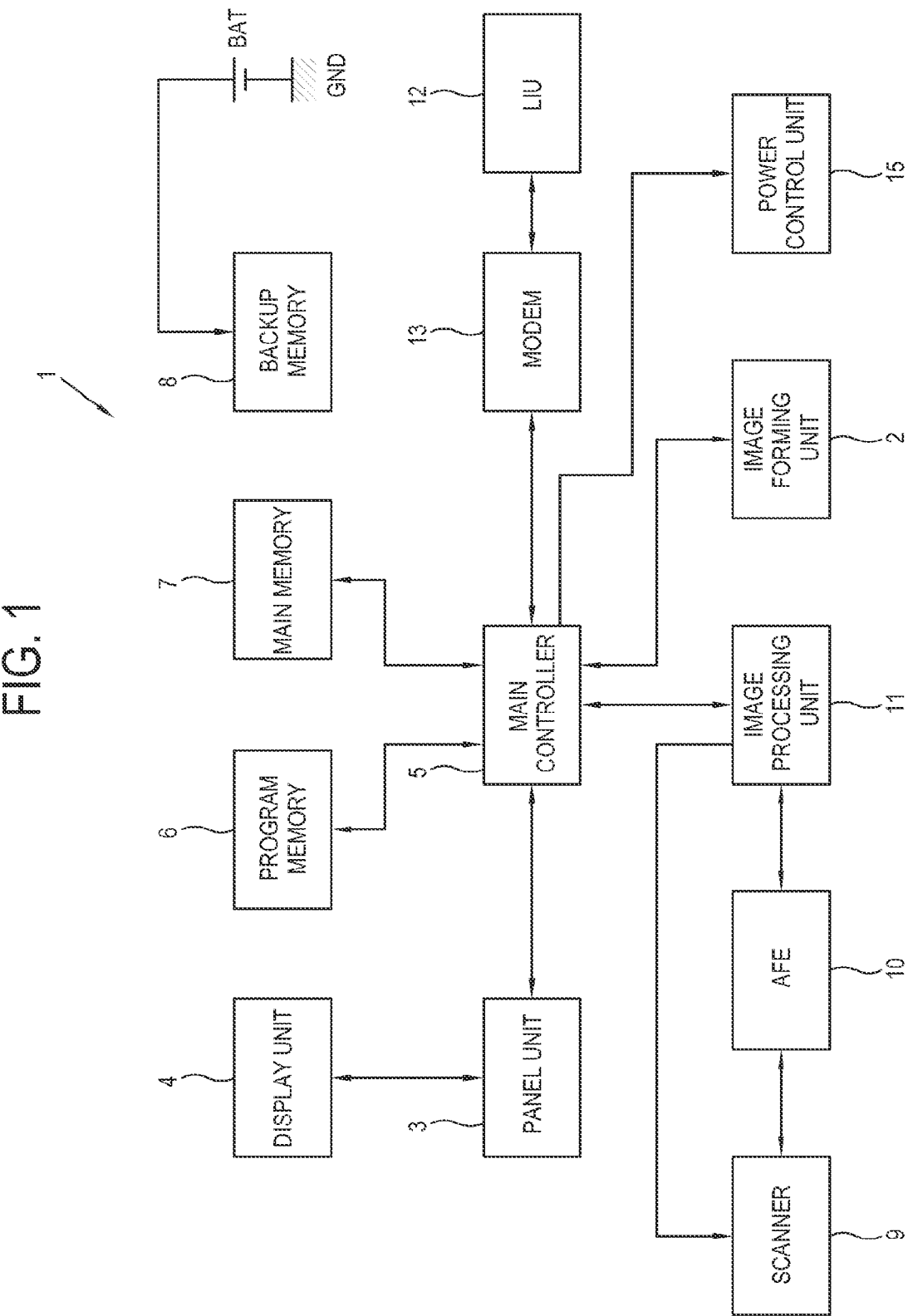
FIG. 1 is a block diagram illustrating a configuration of an image forming apparatus according to exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

For example, in the following example embodiments, the same components are denoted by the same reference numerals throughout the drawings, and explanation thereof may be representatively given for convenience of description.

FIG. 1 is a block diagram illustrating a configuration of an image forming apparatus 1 according to exemplary embodiments of the present general inventive concept. The image forming apparatus 1 illustrated in FIG. 1 may be a printer, a facsimile, a multifunction copier or the like, or any other suitable apparatus to carry out the exemplary embodiments of the present general inventive concept as disclosed herein.

As illustrated in FIG. 1, the image forming apparatus 1 may include an image forming unit 2 to form an image on a printing medium such as paper, a panel unit 3 to receive instructions from a user through a keypad or the like, and a display unit 4 such as a liquid crystal display (LCD) to display operation states and/or other information of the image forming apparatus 1. The image forming apparatus 1 may further include a main controller 5 to control components of the image forming apparatus, a read-only memory (ROM) to store programs to be executed by the main controller 5, a nonvolatile program memory 6 such as a flash memory or the like, and a volatile main memory 7 such as a random access memory (RAM) into which programs stored in the program memory 6 are temporarily loaded for execution by the main controller 5. The main controller 5 may be a central processing unit (CPU), an application specific integrated circuit (ASIC) provided with an input/output (I/O) controller, a field programmable gate array, a programmable logic device, and the like, or any other suitable controller to carry out the exemplary embodiments of the present general inventive concept as disclosed herein. The image forming apparatus 1 may include a backup memory 8 to store backup data such as telephone numbers, user's IDs, data to operate the image forming apparatus 1, and so on, and a battery BAT to supply power to the backup memory 8.

The image forming apparatus 1 may have a scanner 9 including a charge coupling device (CCD) or a CMOS image sensor (CIS) or other device to scan an image on a printing medium such as paper, an analog front end (AFE) 10 to convert an analog signal output by the scanner 9 into a digital signal, and an image processing unit 11 to image process data transferred from the AFE 10. The image forming apparatus 1 may include a line interface unit (LIU) 12 to interface with a public switched telephone network (PSTN), and a modem 13 to modulate and/or demodulate signals transmitted and/or received through LIU 12.

In the example embodiments of FIG. 1, the image forming apparatus 1 can include a power control unit or circuit 15 to control, among other things, the supply of operation power to the main controller 5.

Figure 2:
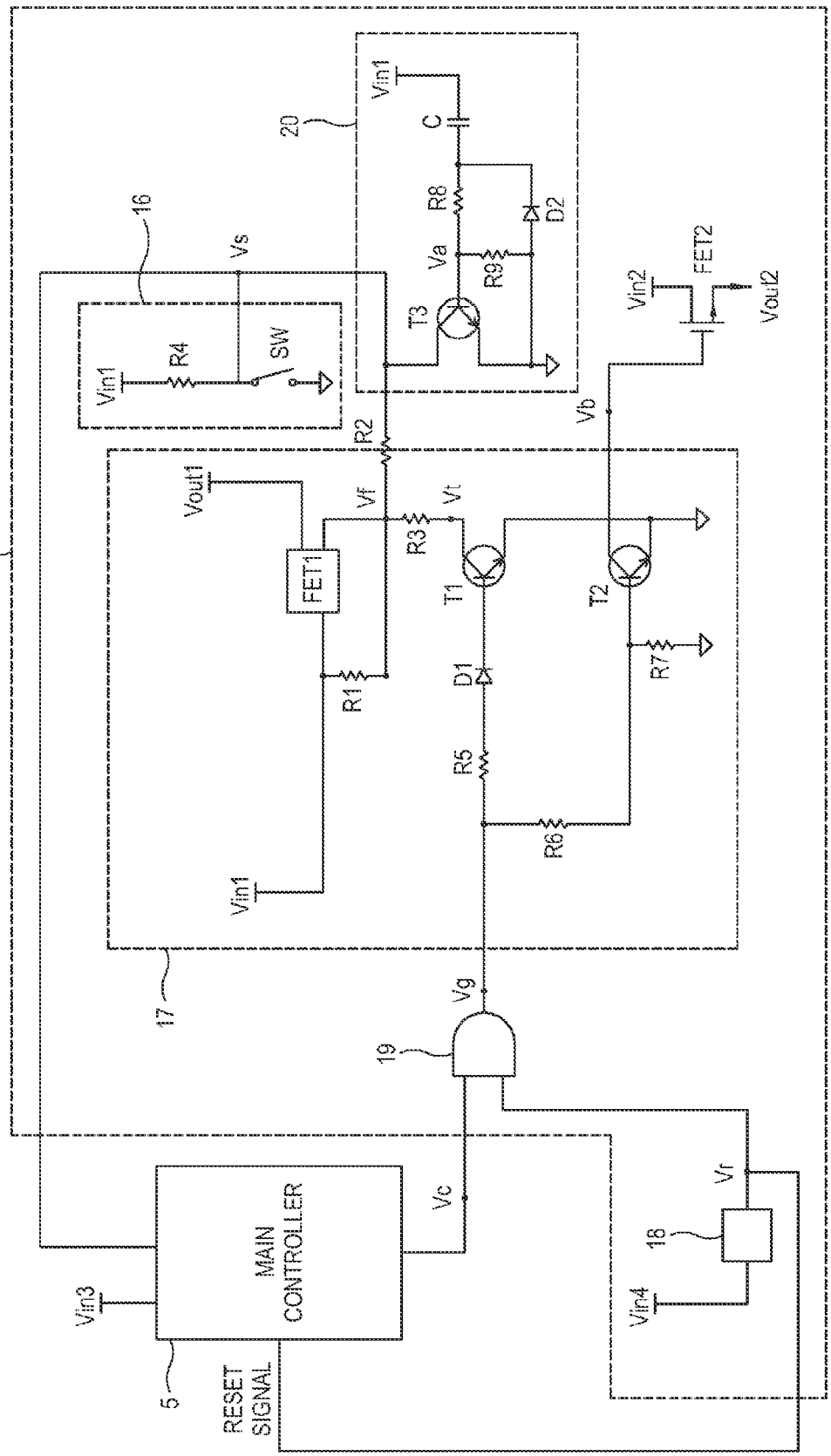
FIG. 2 is a circuit diagram illustrating a configuration of a power control circuit according to exemplary embodiments of the present general inventive concept.

FIG. 2 is a circuit diagram illustrating a configuration of the power control circuit 15 to control a supply of power to the main controller 5 according to exemplary embodiments of the present general inventive concept. Referring to FIG. 2, the power control circuit 15 may include a user switching unit 16, a power switching unit 17, a reset unit 18, and an auxiliary controller 19.

The user switching unit 16 can receive instructions from a user to turn on/off a power source of the image forming apparatus 1, and can output a user operation signal Vs based on a state of the switch SW depending on the user's operation. The user switching unit 16 may be included in the panel unit 3 illustrated in FIG. 1, but is not limited thereto. The user switching unit 16 may include a soft type switch SW. That is, the switch SW can be closed when the user pushes it, and can be returned to an opened state when the user takes his finger off from the switch SW. As illustrated in FIG. 2, the user switching unit 16 may include a resistor R4 connected to one end of the switch SW. First input power Vin1 can be applied to one end of the switch SW through the resistor R4, and the other end of the switch SW can be grounded.

The first input power Vin1 can be continuously supplied to the switch SW when an external power source, such as a commercial AC power source, is connected to the image forming apparatus 1. The first input power Vin1 may have a level of about 5 V, but is not limited thereto, and any suitable voltage level may be used to carry out the exemplary embodiments of the present general inventive concept as disclosed herein. The image forming apparatus 1 may include a power supplying unit (not illustrated), such as a switch mode power supplier (SMPS), to supply the first input power Vin1.

As illustrated in FIG. 2, the user switching unit 16 can output a user operation signal Vs based on a state of the switch SW depending on the user's input operation. The user operation signal Vs can be transferred to the main controller 5 as a predetermined high level when the switch SW is opened and as a predetermined low level when the switch SW is closed.

The power switching unit 17 can receive the first input power Vin1 equivalent to the power supplied to the user switching unit 16, and can perform a switching operation such that the first input power Vin1 can be selectively supplied to other components of the image forming apparatus. The first input power Vin1 of the power switching unit 17 can be output as first output power Vout1.

Referring to FIG. 2, the power switching unit 17 may include a first switching unit FET1. The first switching unit FET1 may be a field effect transistor (FET) with its drain and source coupled respectively to the first input power Vin1 and the first output power Vout1, but is not limited thereto. A gate (see Vf) of the first switching unit FET1 can be coupled to the first input power Vin1 through a resistor R1. Here, the first output power Vout1 is not output (Vout1 is substantially 0 [V]) when the first switching unit FET1 is in an opened state, and is output with substantially the same level of voltage as the first input power Vin1 when the first switching unit FET1 is in a closed state.

The first switching unit FET1 can be controlled to be opened/closed according to a gate voltage Vf. For example, the first switching unit FET1 may be an n channel FET. In this case, the first switching unit FET1 can be in the opened state (Vout1 is substantially 0 [V]) when its gate voltage Vf is logic "High," and can be in the closed state (Vout1 is substantially the same level of Vin1) when its gate voltage Vf is logic "Low." The gate (see Vf) of the first switching unit FET1 can be coupled to the switch SW of the user switching unit 16 through a resistor R2. The gate (see Vf) of the first switching unit FET1 can also coupled to a collector (see Vt) of a first transistor T1 through a resistor R3. Accordingly, the gate voltage Vf of the first switching unit FET1 can be determined by the user operation signal Vs of the user switching unit 16 and the collector voltage Vt of the first transistor T1. That is, the gate voltage Vf of the first switching unit FET1 can have a low level if at least one of the user operation signal Vs and the collector voltage Vt is logic "Low," and can have a high level if both of the user operation signal Vs and the collector voltage Vt is logic "High."

As illustrated in FIG. 2, an emitter of the first transistor T1 can be grounded. The collector voltage Vt of the first transistor T1 can have logic "High" due to the first input power Vin1 via both resistors R1 and R3 when the first transistor T1 is opened, and have logic "Low" with it coupled to the ground when the first transistor T1 is closed. A base of the first transistor T1 can be coupled to the main controller 5 through a resistor R5, a first diode D1 and the auxiliary controller 19. The main controller 5 can output the power control signal Vc to control the first transistor T1 based on the user operation signal Vs of the user switching unit 16. In general, if the user operation signal Vs is logic "Low," that is, if the switch SW is closed by the user's operation, the main controller 5 outputs the power control signal Vc of a high level when the image forming apparatus is powered off, while outputting the power control signal Vc of a low level when the image forming apparatus is powered on. The transistor T1 may be an npn type bipolar transistor. Accordingly, the first transistor T1 may be closed when the power control signal Vc of the main controller 5 has logic "High," and may be opened when the power control signal Vc of the main controller 5 has logic "Low." However, in this embodiment, even when the power control signal Vc of the main controller 5 is switched from Low to High when the image forming apparatus is powered off, the first transistor T1 can remain opened, as described in more detail below.

Referring to FIG. 2, the main controller 5 can operate when it receives third input power Vin3. When the main controller 5 receives third input power, the main controller 5 may output a logic High level of the power control signal Vc by default. The third input power Vin3 can be coupled to the first output power Vout1 of the power switching unit 17. Accordingly, when the first switching unit FET1 is closed to output the first output power Vout1 as described above, the third input power Vin3 can have the same voltage level as the first input power Vin1.

The power control circuit 15 may include a reset unit 18 to reset the main controller 5. When the main controller 5, which may be a CPU, ASIC and so on as described above, is turned on or off, that is, when the third input power Vin3 is supplied to the main controller 5 or not, the reset unit 18 initializes, i.e., resets the main controller 5. The reset unit 18 can output a reset signal Vr and the main controller 5 is initialized by the reset signal Vr. The reset unit 18 can receive a fourth input power Vin4 and can output the reset signal Vr depending on a level of the fourth input power Vin4. The fourth input power Vin4 can be directly coupled to the first output power Vout1 and may accordingly have the same voltage level as the power applied to the main controller 5, or alternatively may be coupled to the first output power Vout1 via any power converting means (not illustrated) to convert a voltage level to a different voltage level so that the fourth input power Vin4 can have a voltage (for example, 3.3 [V]) lower by a predetermined level than the power applied to the main controller 5.

Figure 3:
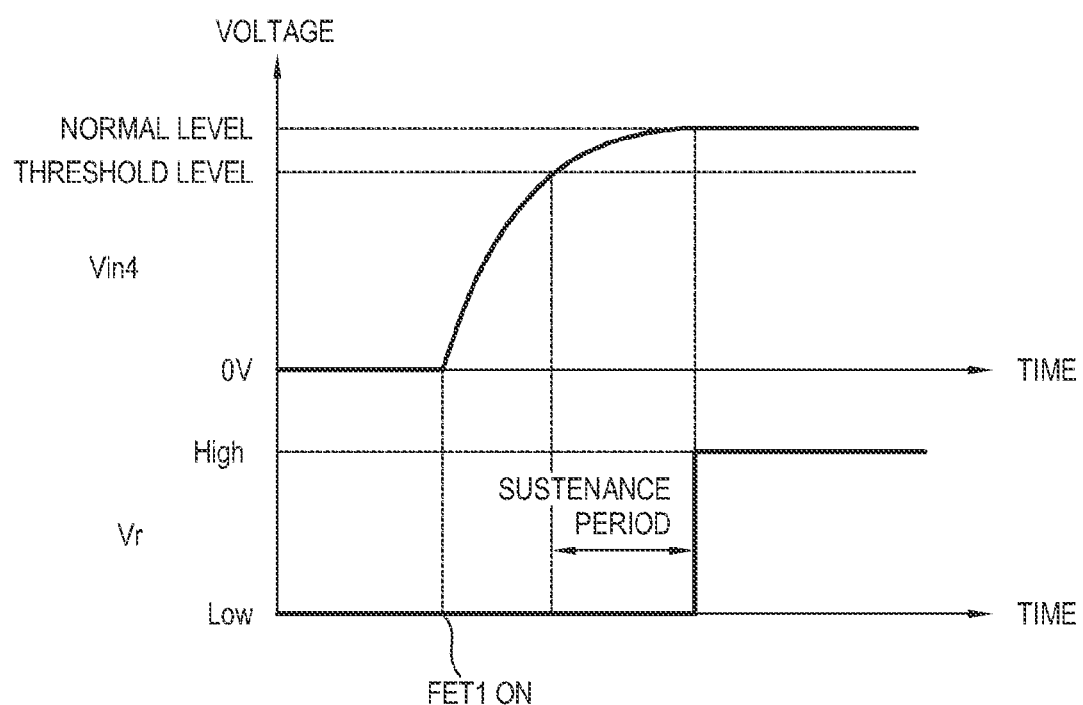
FIG. 3 is a waveform diagram illustrating a reset signal under application of a fourth input power according to exemplary embodiments of the present general inventive concept.

FIG. 3 is a waveform diagram illustrating the reset signal Vr output by the reset unit 18 under application of the fourth input power Vin4. As illustrated in FIG. 3, when the fourth input power Vin4 begins to be applied as the first switching unit FET1 is closed, the fourth input power Vin4 slowly increases in the circuit and reaches a predetermined normal level (for example, 5 [V] or 3.3 [V]) after lapse of a predetermined period of time. The reset unit 18 can switch the reset signal Vr from Low to High after lapse of a predetermined sustenance period of time from the time when the fourth input power Vin4 reaches a predetermined threshold level. The threshold level may be a level (for example, 3 [V]) lower by a predetermined value than the normal level of the fourth input power Vin4. The sustenance period of time may be a period of time (for example, about 50 to 200 [msec]) such that the fourth input power Vin4 may reach the normal level. If the reset signal Vr is switched from Low to High, then the main controller 5 can be initialized to start the normal operation. The third input power Vin3 can have the same property as the fourth input power Vin4, and thus stable operation of the main controller 5 can be achieved by operating the main controller 5 after supplying a sufficient level of power to the main controller 5. The third input power Vin3 can be applied to the main controller 5, and the main controller 5 can output a High level of power control signal Vc as a default. Accordingly, when the reset unit receives the fourth input power Vin4 and outputs a logic High level of reset signal Vr, the auxiliary controller 19 outputs a logic High signal Vg as a result of the AND operation between the logic High reset signal Vr and logic High power control signal Vc, thus closing transistor T1 and enabling FET1 to output the voltage Vout1.

Figure 4:
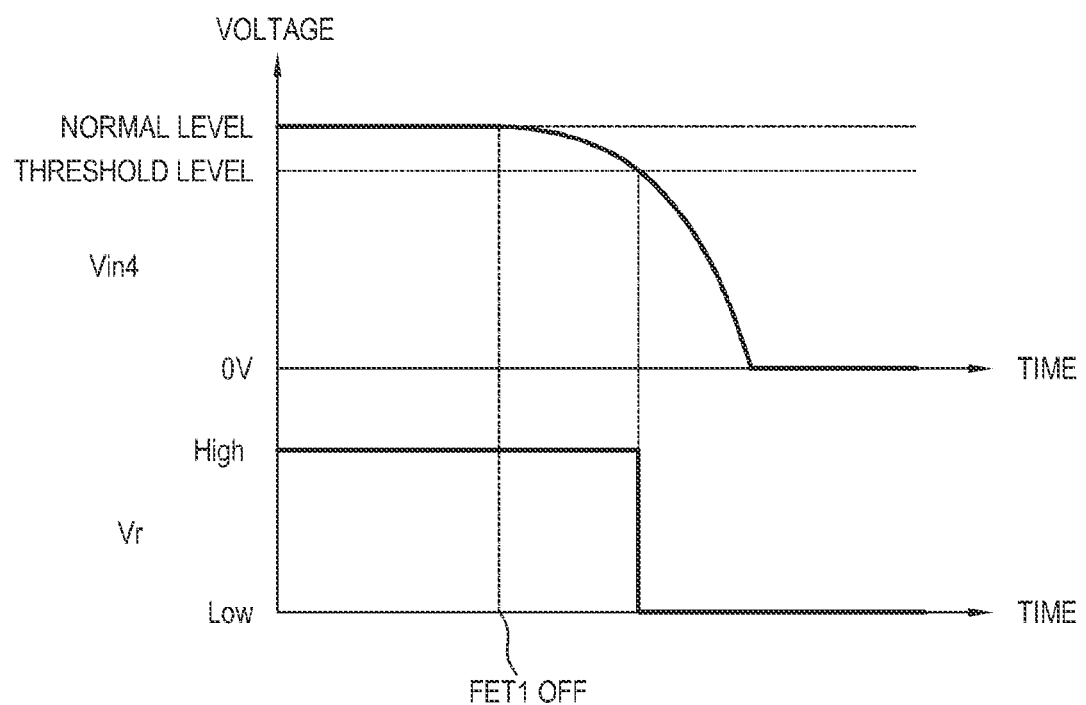
FIG. 4 is a waveform diagram illustrating a reset signal when the fourth input power is not supplied according to exemplary embodiments of the present general inventive concept.

FIG. 4 is a waveform diagram illustrating the reset signal Vr output by the reset unit 18 when the fourth input power Vin4 is not supplied. As illustrated in FIG. 4, when the first switching unit FET1 is opened and the fourth input power Vin4 applied thereto begins not to be supplied, the fourth input power Vin4 can slowly decrease from the predetermine normal level in the circuit and can reach 0 [V] after lapse of a predetermined period of time. When the fourth input power Vin4 decreases to a predetermined threshold level, the reset unit 18 can switch the reset signal Vr from High to Low. The threshold level at which the fourth input power Vin4 begins not to be supplied may be equal to the threshold level at which the fourth input power Vin4 begins to be supplied, as described above. When the reset signal Vr is switched from High to Low, the main controller 5 can be initialized to finish its operation and can enter an off mode. Accordingly, when the power supplied to the main controller 5 decreases below a predetermined threshold level, stable operation of the main controller 5 can be achieved by finishing the operation performed by the main controller 5.

Upon being initialized according to the reset signal Vr, the main controller 5 can output a High level of power control signal Vc. In a power-on state, when the user closes the switch (SW) of the user switching unit 16 in order to turn off the image forming apparatus 1, the main controller 5 can output a Low level of power control signal Vc so that the first transistor T1 and the first switching unit FET1 can be opened according to a Low level of user operation signal Vs of the user switching unit 16. When the fourth input power Vin4 decreases below the threshold level after the first switching unit FET1 is opened, the reset signal Vr is changed from High to Low (see FIG. 4), the main controller 5 can switch the power control signal Vc from Low to High.

As illustrated in FIG. 2, the auxiliary controller 19 can be provided between the main controller 5 and the first transistor T1. In this configuration, the auxiliary controller 19 can maintain the first transistor T1 and the first switching unit FET1 in an open state so that the operation power (see Vin3) may not be again supplied to the main controller 5 even when the power control signal Vc is changed in the power-off state. For example, the auxiliary controller 19, which may be implemented by an AND gate, can perform an AND operation between the power control signal Vc of the main controller 5 and the reset signal Vr of the reset unit 18 to output a signal Vg as a result of the AND operation. Therefore, in the power-off state, since the reset signal Vr has logic Low although the power control signal Vc of the main controller 5 can be switched from Low to High by switching of the reset signal Vr, the first transistor T1 and the first switching unit FET1 remain opened by the signal Vg output as the result of AND operation. Accordingly, in the power-off state, the operation power (see Vin3) can be prevented and/or minimize from being again supplied to the main controller 5 due to the reset signal Vr, which may increase operation reliability.

Hereinafter, exemplary operations of the image forming apparatus 1 according to an embodiment of the present general inventive concept will be described with reference to FIGS. 5 and 6.

Figure 5:
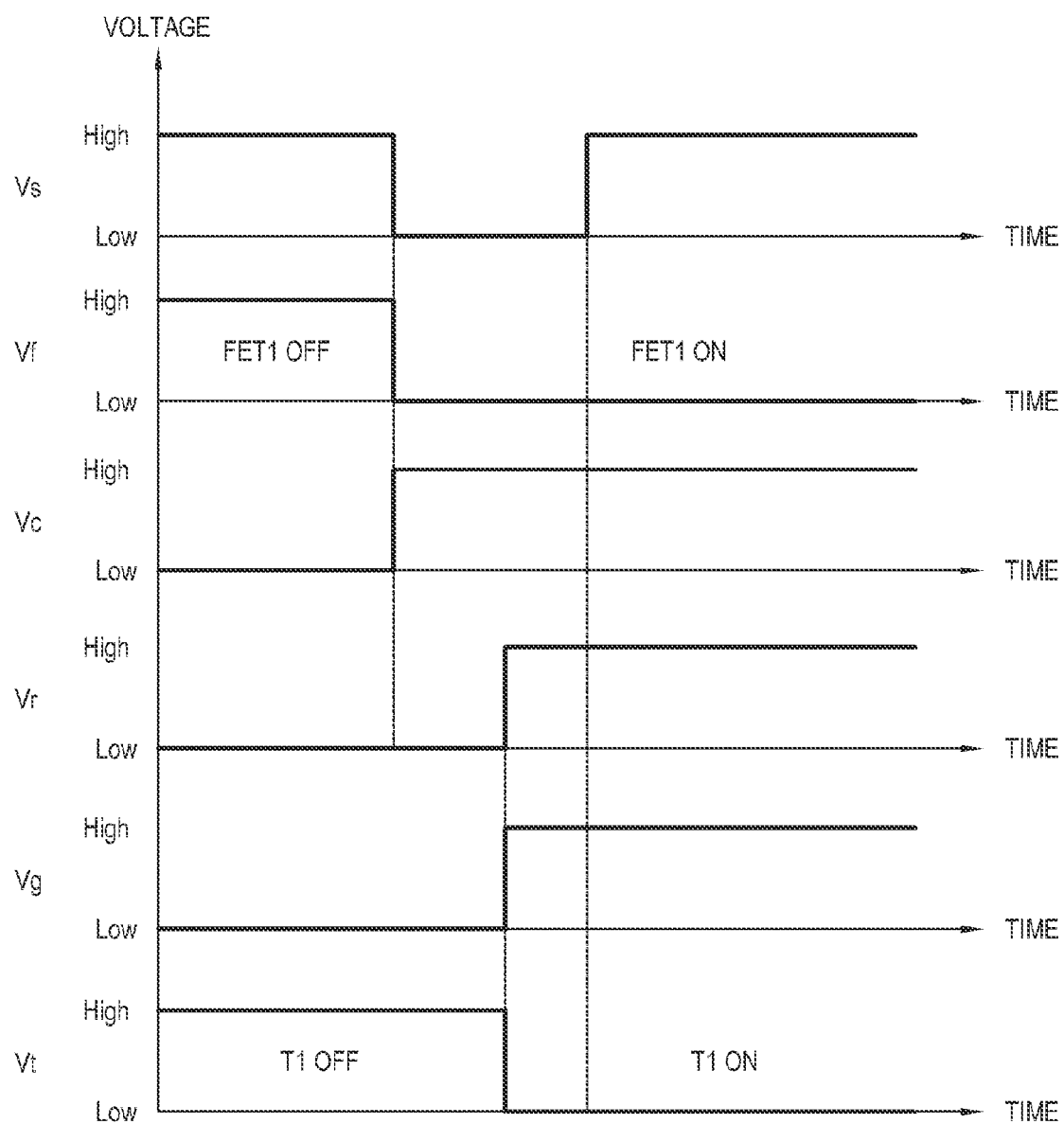
FIG. 5 is a waveform diagram illustrating a level of signal at a plurality of points of the power control circuit illustrated in FIG. 2 when a power source is turned on according to exemplary embodiments of the present general inventive concept.

FIG. 5 is a waveform diagram illustrating a level of a plurality of control signals at one or more points of the power control circuit of FIG. 2 when a power source is turned on. Here, for purposes of illustration, when the image forming apparatus 1 can be assumed to be in the off state, the user operation signal Vs has logic High with the switch SW opened, and the collector voltage Vt has logic High with the first transistor T1 opened. Accordingly, since the first switching unit FET1 can be opened as the gate voltage Vf has logic High, a voltage having the same level as the first input power Vin1 may not be output as the first output power Vout1.

In this condition, when the switch SW is closed by a user's operation to switch the image forming apparatus to a power-on state, the first switching unit FET1 may be closed due to the Low level of the gate voltage Vf caused by the user operation signal Vs being changed to Low, with results being that a voltage having the same level as the first input power Vin1 is output as the first output power Vout1 from the first switching unit FET1. Accordingly, the third input power Vin3, which can correspond to the first input power Vin1, is applied to the main controller 5, and at this time, the main controller 5 outputs a High level of power control signal Vc as a default. The fourth input power Vin4 can be applied to the reset unit 18, and the reset unit 18 can change the reset signal from Low to High when a predetermined sustenance period of time elapses after the fourth input power Vin4 reaches a predetermined threshold level. Accordingly, the main controller 5 can be initialized according to the switching of the reset signal Vr.

On the other hand, the auxiliary controller 19 can change the output signal Vg from Low to High when both of the power control signal Vc of the main controller 5 and the reset signal Vr of the reset unit 18 have logic High. When the output signal Vg is changed to High, the first transistor T1 is changed from an opened (off) state to a closed (on) state, and accordingly the collector voltage Vt of the first transistor T1 is changed from High to Low. That is, when the switch SW is changed from a closed state to an opened state by user's operation (that is, the user operation signal Vs is changed from Low to High), the gate voltage Vf can remain Low by the Low level of collector voltage Vt, and, accordingly, the first switching unit FET1 can be in the on (closed) state. Accordingly, the third input power Vin3 may be applied to the main controller 5, such that the main controller 5 to operate normally.

Figure 6:
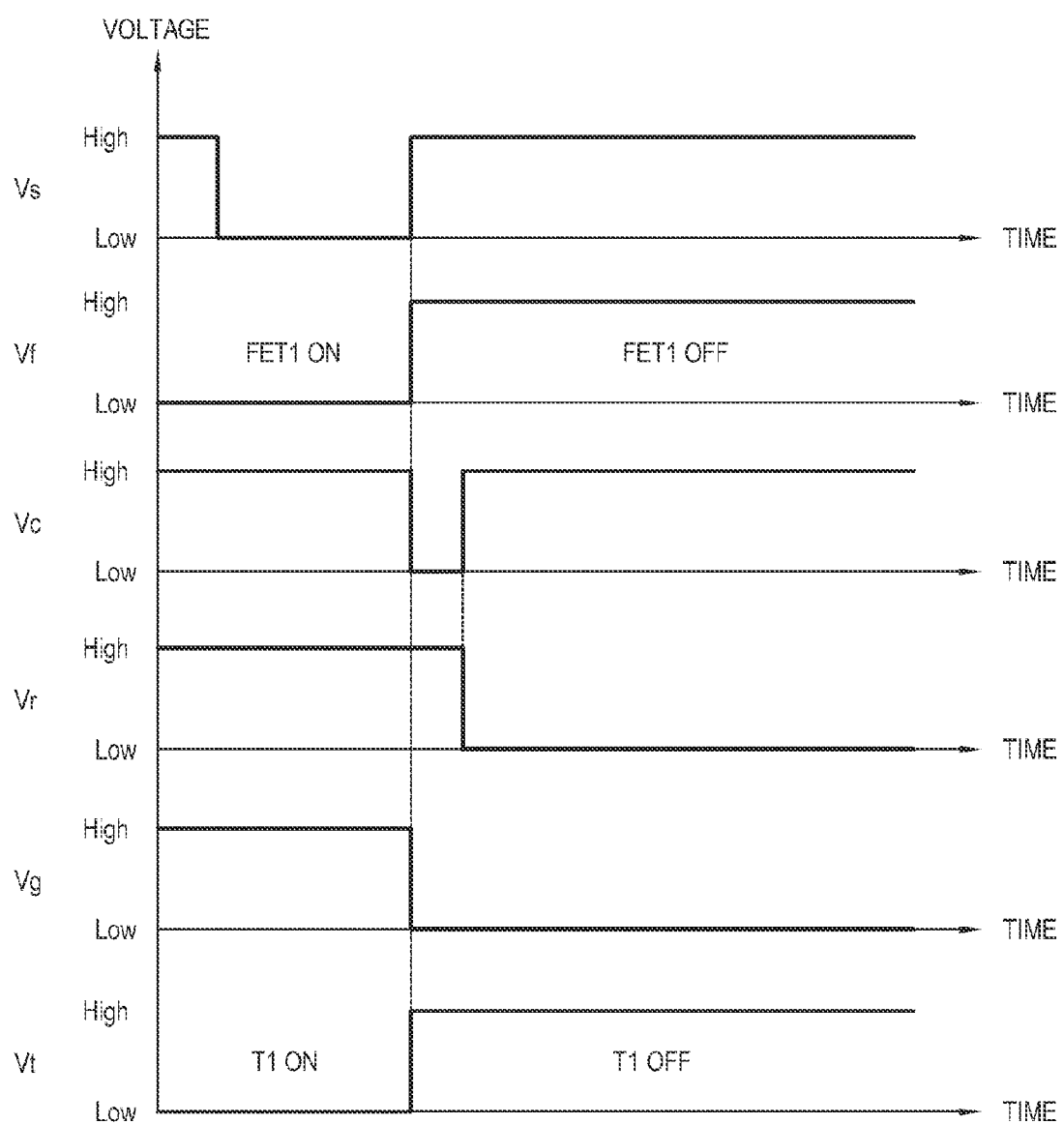
FIG. 6 is a waveform diagram illustrating a level of signal at different points of the power control circuit illustrated in FIG. 2 when a power source is turned off according to exemplary embodiments of the present general inventive concept.

FIG. 6 is a waveform diagram illustrating a level of the plurality signals at different points of the power control circuit 15 when a power source is turned off. Here, the image forming apparatus 1 can be assumed to begin in the on state, while the user operation signal Vs has logic High with the switch SW opened, and the collector voltage Vt has logic Low with the first transistor T1 closed due to the presence of logic High signals Vc, Vr, and Vg. Accordingly, since the first switching unit FET1 is closed due to the gate voltage Vf having a logic Low level, a voltage having the same level as the first input power Vin1 can be output as the first output power Vout1 from the first switching unit FET1.

In this condition, after the switch SW is closed by user's operation to power-off the image forming apparatus and thus the user operation signal Vs is changed to Low, when the switch SW is again opened after lapse of a predetermined period of time, and the user operation signal Vs is changed to High, the main controller 5 can switch the power control signal Vc from High to Low to enter a power-off mode. At this time, since the level of fourth input signal Vin4 has not yet been changed, the reset signal Vr of the reset unit 18 remains at a logic High level. The auxiliary controller 19 can switch the output signal Vg from High to Low based on the result of the AND operation between the Low level of power control signal Vc and the High level of reset signal Vr. Accordingly, the first transistor T1 can be opened and thus the collector voltage Vt can be logic High. As the gate voltage Vf has logic High and thus the first switching unit FET1 can be opened, a voltage having the same level as the first input power Vin1 may not be output as the first output power Vout1.

When the first output power Vout1 begins not to be supplied and the level of fourth input power Vin4 decreases to a predetermined threshold level after lapse of a predetermined period of time, the reset unit 18 can switch the reset signal Vr from High to Low. At this time, when the reset signal Vr is switched, the power control signal Vc of the main controller 5 is changed from Low to High. However, even though the power control signal Vc of the main controller 5 is changed to logic High, the auxiliary controller 19 can maintain the output signal Vg at Low based on the result of the AND operation between the High level of power control signal Vc and the Low level of reset signal Vr. As the first transistor T1 and the first switching unit FET1 can remain opened, it is possible to minimize and/or prevent operation power from being supplied again to the main controller 5 when the image forming apparatus is powered off.

Referring again to FIG. 2, when external power is applied to the power control circuit 15 in the power-off state, the power control circuit 15 may include an operation trigger 20 to enable operation power to be supplied to the main controller 5. In exemplary embodiments of the present general inventive concept, the operation trigger 20 can include a third transistor T3 and a capacitor C such that a collector of the third transistor T3 can be connected to a gate Vf of the first switching unit FET1 via a resistor R2, and an emitter thereof can be grounded. A base Va of the third transistor T3 can be connected to one end of the capacitor C via a resistor R8. The other end of the capacitor C can be connected to the first input power Vin1. The third transistor T3 may be an npn type transistor.

When a normal level of voltage is not supplied to the first input power Vin1, for example, when a power failure occurs, a normal level of voltage may not supplied to the first input power Vin1. That is, when the third transistor T3 may be opened, a collector potential of the third transistor T3 and the gate voltage Vf of the first switching unit FET1 may have logic High. Since a gate voltage Vf of the first switching unit FET1 has logic High, the first switching unit FET1 can be placed in the opened state.

However, when power is restored in this condition, the first input power Vin1 may be transmitted to the base Va of the third transistor T3 through the capacitor C. At this time, a potential of the base Va can have a logic High level to close the third transistor T3, and the collector potential (same as a potential of the user operation signal Vs) of the third transistor Va can be grounded, and thus can have a logic Low level. The gate voltage Vf of the first switching unit FET1 can have a logic Low level to make the first switching unit FET1 closed, and thus operation power can be supplied as the first output power Vout1. Since the user operation signal Vs has also logic Low, the main controller 5 can perform an operation when powered on as described above.

Thereafter, when the capacitor C is charged, the first input power Vin1 may not be transmitted to the base Va of the third transistor T3 any longer. Accordingly, the potential of the base Va has logic Low level to open the third transistor T3, and the collector potential of the third transistor T3 has no effect on the user operation signal Vs.

The power control circuit 15 may include a second switching unit FET2 to selectively supply operation power to the image forming unit 2 illustrated in FIG. 1. The second switching unit FET2 may be implemented by an n-channel FET and may include a drain connected to the second input power Vin2 and a source connected to the second output power Vout2. The second input power Vin2 may be supplied from the above-mentioned power supplying unit and may have a voltage (for example, about 24 [V]) of a level higher than the first input power Vin1. The second output power Vout2 may be connected to an operation power input terminal (not illustrated) of the image forming unit 2. The second switching unit FET2 may be an example of the second power switching unit.

The power control circuit 15 may include an npn-type second transistor T2 having a collector Vb connected to a gate of the second switching unit FET2. An emitter of the second transistor T2 is grounded, and its base can be connected to an output terminal of the auxiliary controller 19 via a resistor R6 and may receive the output signal Vg therefrom.

When powered on, if the output signal Vg of the auxiliary controller 19 can have a logic High level, the second transistor T2 can be closed and a potential Vb of the collector of the second transistor T2 and the gate of the second switching unit FET2 can have a logic Low level. Accordingly, since the second switching unit FET2 is closed, a voltage having the same level as the second input power Vin2 is output as the second output power Vout2.

When the image forming apparatus is powered-off, if the output signal Vg of the auxiliary controller 19 has logic Low, the second transistor T2 is opened, and the potential Vb of the collector of the second transistor T2 and the gate of the second switching unit FET2 can have logic High. Accordingly, since the second switching unit FET2 is opened, a voltage having the same level as the second input power Vin2 may not be output as the second output power Vout2.

Figure 7:
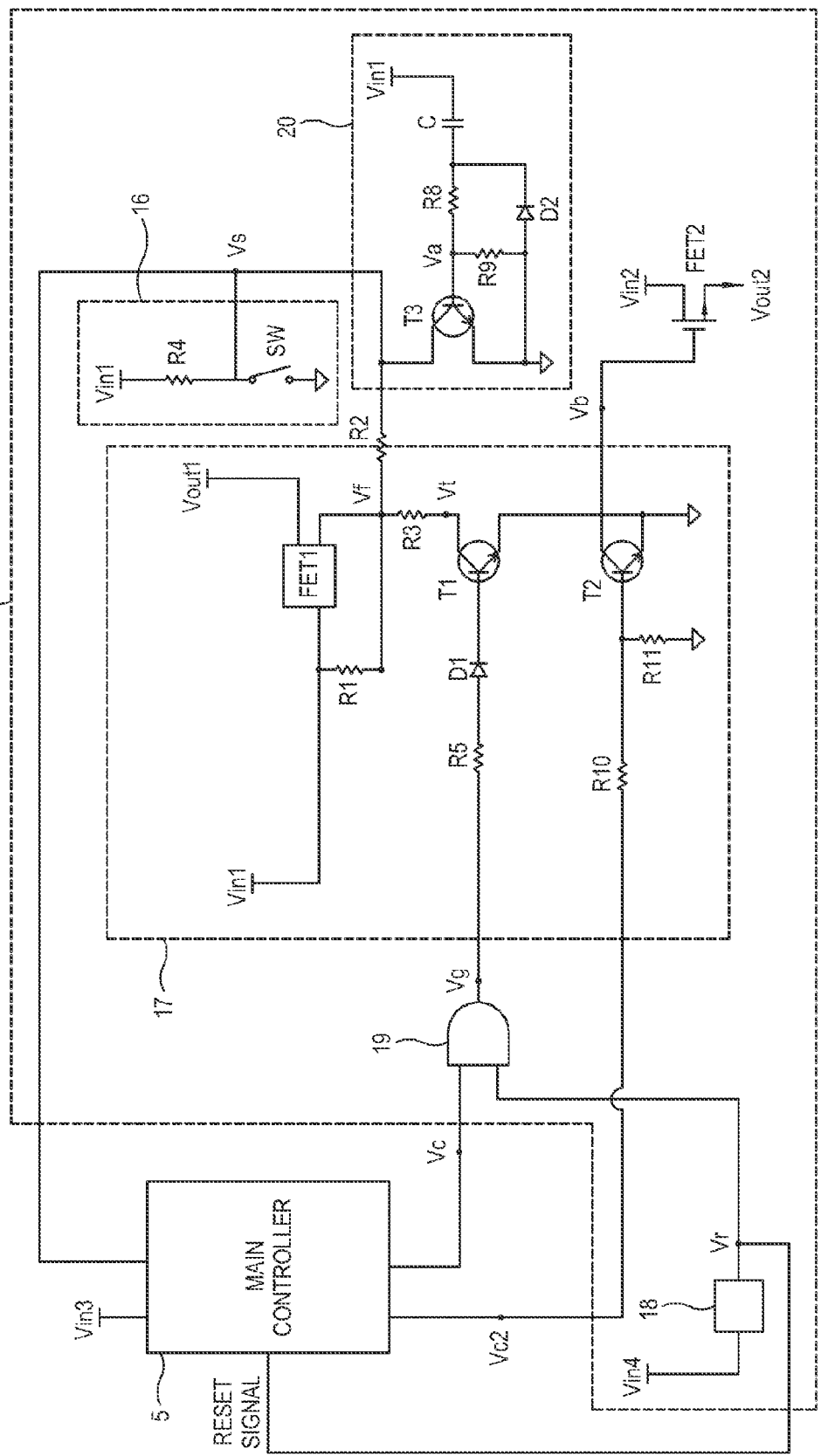
FIG. 7 is a circuit diagram illustrating a configuration of a power control circuit according to exemplary embodiments of the present general inventive concept.

FIG. 7 is a circuit diagram illustrating a power control circuit 15a according to exemplary embodiments of the present general inventive concept. As illustrated in FIG. 7, the base of the second transistor T2 may not be connected to the output terminal Vg of the auxiliary controller 19 but may be connected to an output terminal Vc2 of a second power control signal of the main controller 5 via resistors R10 and R11. The main controller 5 can output a High level of second power control signal Vc2 when powered on and a Low level of second power control signal Vc2 when powered off, and the second transistor T2 and the second switching unit FET2 can be operated.

Figure 8:
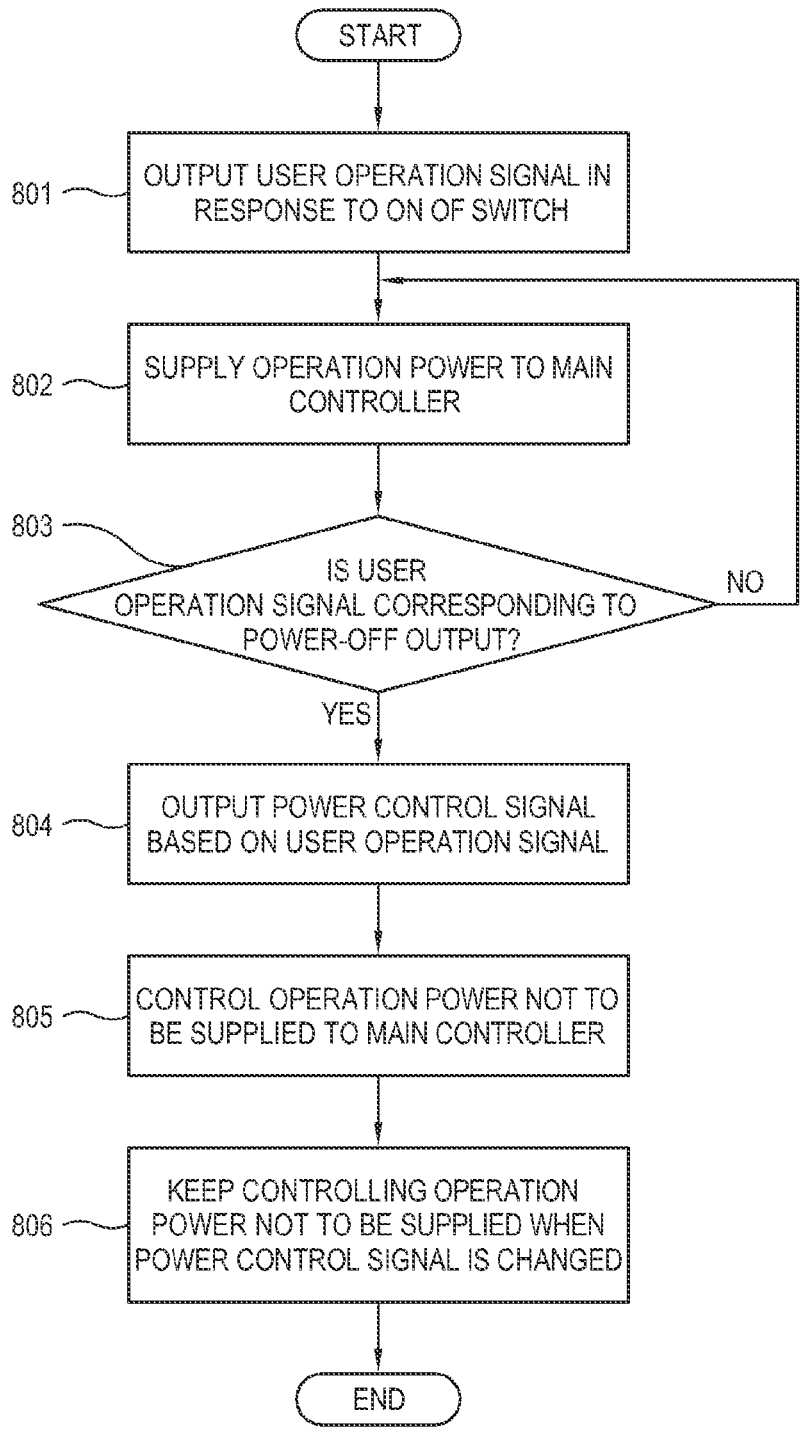
FIG. 8 is a flow chart illustrating a process performed by the image forming apparatus according to exemplary embodiments of the present general inventive concept.

FIG. 8 is a flow chart illustrating a process performed by the image forming apparatus 1 according to exemplary embodiments of the present general inventive concept. When powered off, if a user pushes the switch SW, the user operation signal Vs can be output in response to closing (ON) of the switch SW by the user's operation at operation 801. The first switching unit FET1 can be closed in response to the user operation signal Vs, and the third input power Vin3 can be supplied to the main controller 5 at operation 802. When in the power-on state, the main controller 5 can detect the user operation signal Vs and can check whether or not a user operation signal Vs corresponding to a power-off state has been output at operation 803. If it is checked that the user operation signal Vs corresponding to the power-off state is not output, the operation 802 can continue to be performed.

On the other hand, if it is checked in the operation 803 that the user operation signal Vs corresponding to the power-off has been output, then the main controller 5 can output a power control signal to enter a power-off mode at operation 804. Subsequently, the first switching unit FET1 can be opened by the power control signal in accordance with the power-off state and accordingly the third input power Vin3 may not be supplied to the main controller 5 at operation 805. When the power control signal corresponding to the power-off mode of the main controller 5 is changed due to a reset signal Vr and so on, the auxiliary controller 19 may control the first switching unit FET1 to be opened such that the third input power Vin3 is not supplied to the main controller 5 at operation 806.

Figure 9:
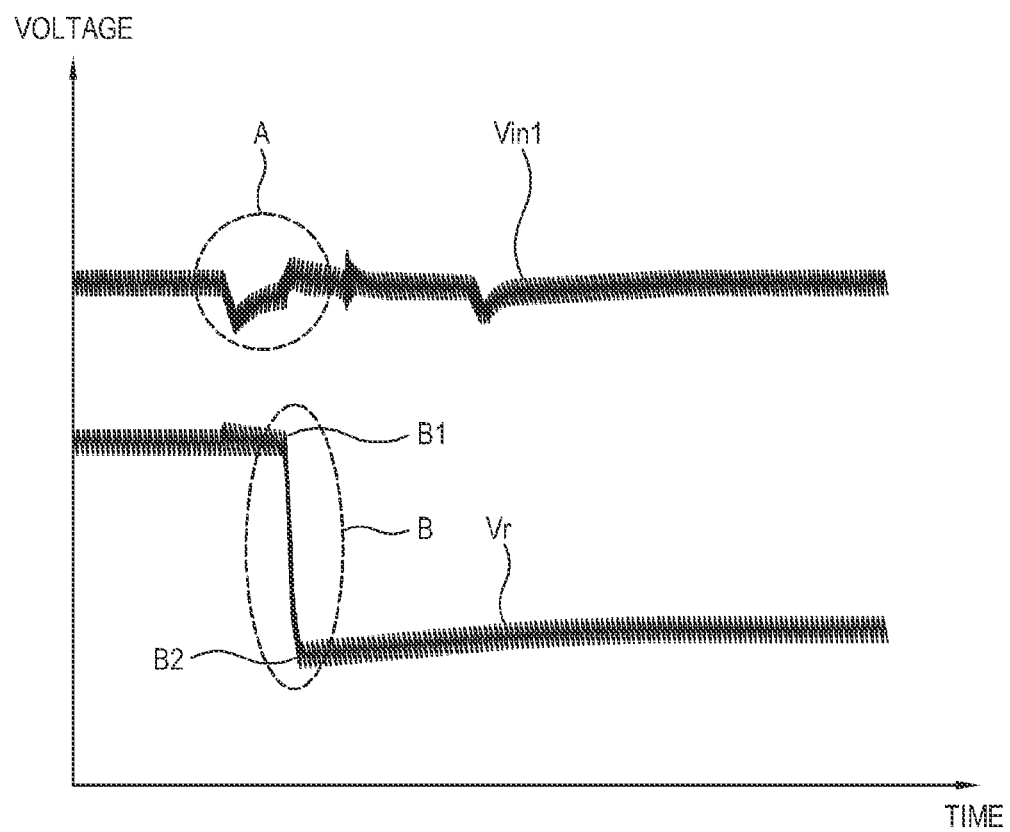
FIG. 9 illustrates an example of waveforms of a first input power and a reset signal of the image forming apparatus of FIG. 1 according to exemplary embodiments of the present general inventive concept.

Exemplary embodiments of the present general inventive concept will be described below with reference to FIGS. 9, 10, and 11. FIG. 9 illustrates an example of waveforms of the first input power Vin1 and the reset signal Vr of the image forming apparatus 1 described above in connection with FIGS. 1 through 8. The waveform of the first input power Vin1 illustrated in FIG. 9 can denote that the first input power Vin1 is changed (e.g., instantly and suddenly changed) by electrostatic discharge or any other factor that may change the first input power Vin1 (refer to "A" in FIG. 9). As illustrated in FIG. 9, the first input power Vin1, which typically has a predetermined level, may be reduced by a predetermined level at "A", and can return to a normal level (e.g., a predetermined voltage level) after a predetermined period of time or after the electrostatic discharge or the like has dissipated.

The change of the first input power Vin1 can change the first output power Vout1 and the fourth input power Vin4. Accordingly, the reset signal Vr as illustrated in FIG. 9 can be reduced from a High voltage level (illustrated as B1 in FIG. 9) to a Low voltage level (illustrated as B2 in FIG. 9) when the fourth input power Vin4 is decreased to a predetermined threshold level as described above with reference to FIG. 4.

In exemplary embodiments of the present general inventive concept, it may be assumed that a change of the first input power Vin1 can occur when the image forming apparatus 1 is powered on and normally operates, and the auxiliary controller 19 of the image forming apparatus 1 can include the AND gate as illustrated in FIG. 2. If the reset signal Vr is switched from High to Low by the change of the first input power Vin1, one of the two inputs of the auxiliary controller 19 can be Low so that the output Vg is switched from High to Low. Accordingly, the first transistor T1 and the first switching unit FET1 can be turned off, and thus the first output power Vout1 of a normal level is not output, so that the image forming apparatus 1 may operate in an operation mode other than a normal operation mode. In other words, if the first input power Vin1 is changed by a predetermined factor, the image forming apparatus 1 may not operate normally (e.g., may operate in an operation mode that is different from a normal operation mode) because of the drop of the reset signal Vr, even though the first input power Vin1 returns to the normal level again after a predetermined time elapses.

Figure 10:
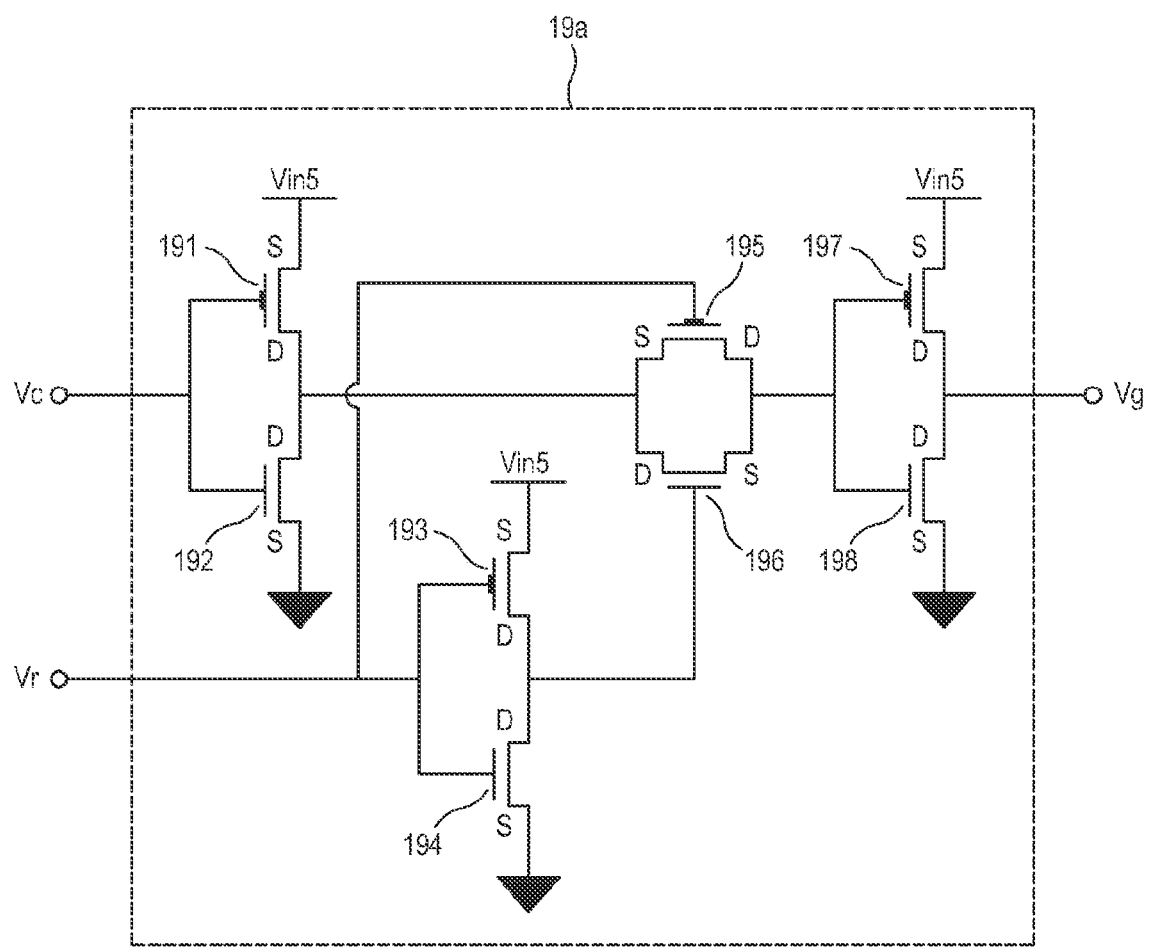
FIG. 10 illustrates a configuration of an auxiliary controller of an image forming apparatus according to exemplary embodiments of the present general inventive concept.

FIG. 10 illustrates an auxiliary controller 19a of an image forming apparatus 1 according to exemplary embodiments of the present general inventive concept. The auxiliary controller 19a in the exemplary embodiments illustrated in FIG. 10 can replace the auxiliary controller 19 described with reference to FIGS. 1 through 8. The image forming apparatus 1 that includes the auxiliary controller 19a in the exemplary embodiments illustrated in FIG. 10 may be equal or similar to that of the image forming apparatus 1 described above with reference to FIGS. 1 through 8.

As illustrated in FIG. 10, the auxiliary controller 19a in exemplary embodiments of the present general inventive concept, which may be provided between the main controller 5 and the first transistor T1, can receive a power control signal Vc and can output an output signal Vg. Like the auxiliary controller 19 described above with reference to FIGS. 1 through 8, the auxiliary controller 19a in the exemplary embodiments of the present general inventive concept may keep the first transistor T1 and the first switching unit FET1 opened so that the operation power (see Vin3) may not be supplied again to the main controller 5 when the power control signal Vc is changed in the state of power-off. In other words, the auxiliary controller 19a in the exemplary embodiments of the present general inventive concept illustrated in FIG. 10 can control the image forming apparatus 1 to be normally powered off without being powered on again by some factor if a user intentionally turns off the image forming apparatus 1.

The auxiliary controller 19a in the exemplary embodiments of the present general inventive concept illustrated in FIG. 10 can control the image forming apparatus 1 to continue normal operation without being powered off even though the reset signal Vr drops (i.e. is decreased) since the first input power Vin1 is changed by not the intentional power-off of that may be selected by a user but by the electrostatic discharge or the like factors when the image forming apparatus 1 normally operates.

The auxiliary controller 19a in the exemplary embodiments of the present general inventive concept may be configured by combination of four pairs of FETs 191 and 192, 193 and 194, 195 and 196, and 197 and 198 as illustrated in FIG. 10. In FIG. 10, "D" and "S" denote the drain and the source of each FET 191, 192, 193, 194, 195, 196, 197 and 198 of the auxiliary controller 19a. Also, "Vin5" denotes fifth input power, which may have the same level and properties as the fourth input power Vin4 described with reference to FIGS. 1 through 8. The auxiliary controller 19a illustrated in FIG. 10 may be a "D-latch" or any other suitable circuit to carry out the exemplary embodiments of the present general inventive concept.

Figure 11:
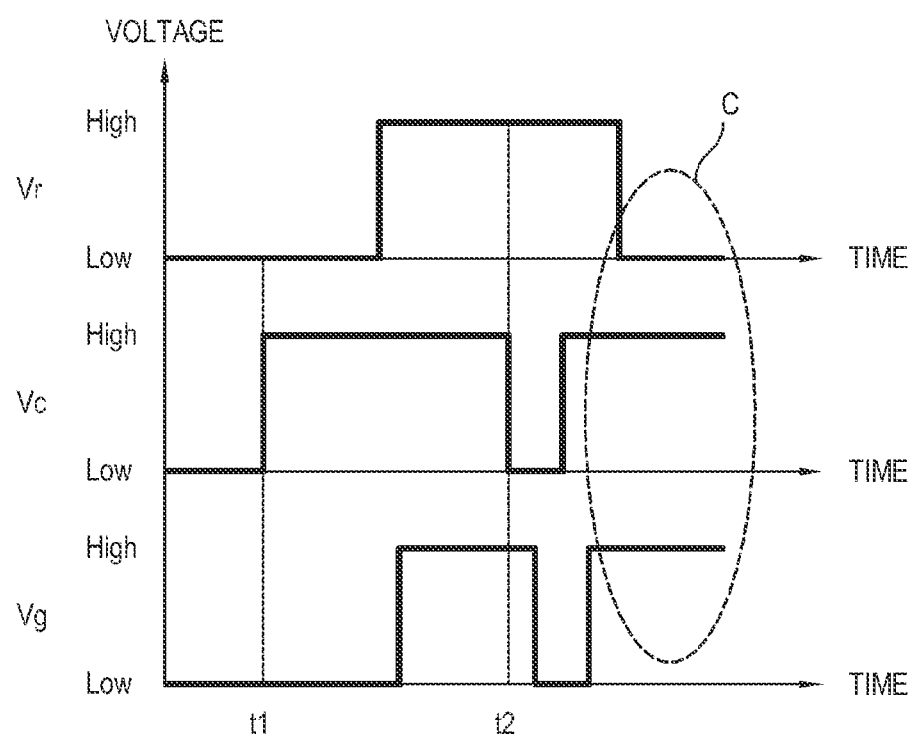
FIG. 11 illustrates waveforms corresponding to an operation of the auxiliary controller of FIG. 10 according to exemplary embodiments of the present general inventive concept.

FIG. 11 illustrates waveforms corresponding to an operation of the auxiliary controller of FIG. 10. In exemplary embodiments of the present general inventive concept, it may be assumed that both the reset signal Vr and the power control signal Vc are Low. This state corresponds to when the image forming apparatus 1 is powered off. The output Vg of the auxiliary controller 19a can be Low. In this state, as illustrated in FIG. 11, if a user powers on the image forming apparatus 1 (i.e., if the switch SW is closed) at "t1", the power control signal Vc can be switched from Low to High as described above with reference to FIGS. 1 through 8. Thus, as described with reference to FIG. 3, the reset signal Vr can be switched from Low to High after a predetermined period of time elapses. If both the power control signal Vc and the reset signal Vr are High, the output Vg of the auxiliary controller 19a can be switched from Low to High. The first transistor T1 and the first switching unit FET1 can be powered on, and the first output power Vout1 of a normal level can be output so that the image forming apparatus 1 can operate normally.

In exemplary embodiments of the present general inventive concept, it may be assumed that the first input power Vin1 is changed at "t2" as illustrated in FIG. 11 when the image forming apparatus 1 operates normally. The power control signal Vc can be switched from High to Low because of the change of the first input power Vin1, and can return to the normal level of High again after a predetermined amount of time. The reset signal Vr can be High when the fourth input power Vin4 does not yet decrease to a predetermined threshold level, and thus the output Vg of the auxiliary controller 19a can be switched from High to Low in response to the change of the power control signal Vc and can return to the normal level of High again. The first transistor T1 and the first switching unit FET1 (as illustrated in FIG. 2) may be instantly turned off, but can return to a normal turned-on state. The duration of the turned-off time may be too short to change the operation of the image forming apparatus 1.

When the fourth input power Vin4 drops to a predetermined threshold level, the reset signal Vr can be switched from High to Low. The auxiliary controller 19a can maintain and/or keep the output Vg in the previous state of High if the power control signal Vc is High, even though the reset signal Vr is Low (refer to "C" in FIG. 11). Thus, as the output Vg of the auxiliary controller 19a can continue to be High, the first transistor T1 and the first switching unit FET1 can be unchangingly turned on such that the image forming apparatus 1 can operate normally.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although several exemplary embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus comprising:
   a main controller to output a first power control signal based on a power-on/off state signal;
   a reset unit to output a reset signal to reset the main controller depending on a level of a power input to the reset unit;
   an auxiliary controller to output a second power control signal based on the first power control signal and the reset signal;
   and a power switching unit to selectively supply an operation power to the main controller based on the second power control signal.

2. The electronic apparatus of claim 1, wherein the first power control signal is changed if the main controller is reset in a power-off state.

3. The electronic apparatus of claim 2, wherein the auxiliary controller controls the power switching unit such that the operation power is supplied to the main controller when the main controller is reset in a power-on state.

4. The electronic apparatus of claim 2, wherein the auxiliary controller includes a logic gate unit to perform a logical operation between the first power control signal and the reset signal.

5. The electronic apparatus of claim 1, further comprising an operation trigger to control the power switching unit to supply the operation power to the main controller if external power is applied to the operation trigger in a power-off state.

6. The electronic apparatus according to claim 1, wherein the auxiliary controller controls the power switching unit to supply the operation power to the main controller when the reset signal is changed when the main controller is in a power-on state.

7. The electronic apparatus of claim 1, wherein the auxiliary controller outputs the second power control signal such that the operation power is not supplied to the main controller when the first power control signal is changed in a power-off state.

8. The electronic apparatus of claim 1, further comprising a user switch unit to output the power-on/off state signal according to user's operation.

9. A method of controlling an electronic apparatus including a controller and a reset unit, the method comprising:
   outputting a first power control signal based on a power-on/off state signal;
   outputting a reset signal to reset the controller depending on a level of a power input to the reset unit;
   outputting a second power control signal based on the first power control signal and the reset signal;
   and selectively supplying an operation power to the controller based on the second power control signal.

10. The method of claim 9, wherein the first power control signal is changed if the controller is reset in a power-off state.

11. The method of claim 10, further comprising supplying the operation power to the controller when the controller is reset in a power-on state.

12. The method of claim 9, further comprising supplying the operation power to the controller if external power is applied in a power-off state.

13. The method according to claim 9, further comprising supplying the operation power to the main controller when the reset signal is changed when the main controller is in a power-on state.

14. The method of claim 9, wherein the outputting the second power control signal comprises outputting the second power control signal such that the operation power is not supplied to the main controller when the first power control signal is changed in a power-off state.

15. The method of claim 9, further comprising outputting the power-on/off state signal according to user's operation on a user switch unit.

* * * * *

UNITED STATES PATENT AND TRADEMARK OFFICE
CERTIFICATE OF CORRECTION

PATENT NO. : 9,110,645 B2  Page 1 of 1
APPLICATION NO. : 13/707012
DATED : August 18, 2015
INVENTOR(S) : Seog-ho Song et al.

It is certified that error appears in the above-identified patent and that said Letters Patent is hereby corrected as shown below:

In the specification,

Column 1, Lines 14-15

After "from" delete "This application claims priority under".

Signed and Sealed this
First Day of December, 2015

Michelle K. Lee
*Director of the United States Patent and Trademark Office*